(12) United States Patent
Vandrovec

(10) Patent No.: US 8,497,784 B1
(45) Date of Patent: Jul. 30, 2013

(54) TOUCH SCREEN CLICKABLE CREW ALERT SYSTEM CONTROL

(75) Inventor: Kevin J. Vandrovec, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 370 days.

(21) Appl. No.: 12/873,938

(22) Filed: Sep. 1, 2010

(51) Int. Cl.
*G08B 23/00* (2006.01)

(52) U.S. Cl.
USPC .......................................... 340/963; 340/945

(58) Field of Classification Search
USPC .............. 340/945, 959, 963–980, 461; 701/3, 701/14, 29, 211; 345/334, 856
See application file for complete search history.

(56) References Cited

U.S. PATENT DOCUMENTS

| 6,038,498 | A  | * | 3/2000  | Briffe et al. ....................... 701/3 |
| 6,112,141 | A  | * | 8/2000  | Briffe et al. ..................... 701/14 |
| 6,668,215 | B2 | * | 12/2003 | Lafon et al. ....................... 701/3 |

* cited by examiner

*Primary Examiner* — Van T. Trieu
(74) *Attorney, Agent, or Firm* — Donna P. Suchy; Daniel M. Barbieri

(57) ABSTRACT

An integrated crew alert and checklist function system is configured to provide single touch direct access to critical checklists in response to a message in the crew alert message window. More particularly, the system is configured to display crew alert message in a crew alert system message window, and in response to a single touch of the crew alert message on the touch screen, the system is configured to automatically display a checklist corresponding to the crew alert message.

20 Claims, 3 Drawing Sheets

TOUCH SCREEN CLICKABLE CREW ALERT SYSTEM CONTROL

BACKGROUND

The increasing system complexity of modern aircraft generally requires the conversion from conventional electromechanically driven instrumentation to electronic software driven flight instrumentation systems, which are sometimes referred to as "glass cockpits." A typical electronic flight instrumentation system includes at least one primary flight display and at least one a multifunction display (MFD), along with an engine indicating and crew alerting system (EICAS) display. Each of these systems/displays may be cursor, button, or touch screen activated.

An EICAS generally includes a dedicated display configured to operate as an integrated system for providing pilots with instrumentation related to aircraft engines, hydraulic systems, electrical systems, environmental systems, control surface position systems, deicing systems, and other vital aircraft systems and components. Additionally, the EICAS is also configured to generate warning messages and annunciations when any of these systems reach or approach a predefined critical parameter for the particular system or component. As such, when the EICAS generates a critical parameter warning message, the crew response is generally to locate the appropriate remedial procedure checklist and begin remediating the identified issue.

However, one challenge with current EICAS systems is that valuable time is lost in the process of the crew locating the remedial procedure checklist, as the crew is generally required to click or select through several cursor movements on the MFD or the EICAS display to obtain the applicable checklist. As such, there is a need for a system and method for quickly and easily providing critical information checklist information to aircraft crew in response to a crew alert warning message.

SUMMARY

Embodiments of the disclosure generally provide an integrated crew alert and checklist display system configured to provide touch screen (direct) access to critical checklists in response to a message in the crew alert message window. More particularly, the system is configured to display crew alert message and/or focus indicator in the crew alert system message window, and in response to the message, the system is configured to receive a single touch screen input from the pilot or copilot on the crew alert system message window that activates an automatic display of a checklist corresponding to the crew alert message.

Embodiments of the disclosure may further provide a crew alert system that includes a plurality of aircraft parameter sensors, a processor in communication with the plurality of aircraft parameter sensors, a checklist database in communication with the processor, and a touch screen display in communication with the processor. The processor may be configured to generate a crew alert warning message in response to a predefined sensor parameter, receive a single touch screen input on the displayed crew alert warning message, and retrieve and display, in response to the single touch screen input, a checklist corresponding to the crew alert warning message.

Embodiments of the disclosure may further provide an EICAS that includes an onboard aircraft computer and an integrated touch screen EICAS display. The onboard aircraft computer is generally in communication with a plurality of aircraft sensors configured to monitor engine parameters, control surface parameters, hydraulic system parameters, and electrical system parameters, the onboard aircraft computer running a software program that supports the processor receiving inputs from the plurality of aircraft sensors and generating crew alert system (CAS) warning messages therefrom. The integrated touch screen EICAS display is generally configured to simultaneously display aircraft engine parameters and CAS warning messages, the EICAS display also being configured to receive a single touch screen input from an aircraft crew member corresponding to the CAS warning message and to display a predetermined checklist corresponding to the selected CAS warning message in response to the single touch screen input.

Embodiments of the disclosure may further provide a method for single touch display of crew alert messages and corresponding checklists in an aircraft monitoring system. The method generally includes sensing aircraft system parameters, generating a crew alert message from the sensed system parameters, and displaying the generated crew alert message integrated with aircraft engine indicator information on a touch screen display. The method may further include receiving a single input selection on the touch screen display directly over the generated crew alert message, and in response thereto, determining an aircraft checklist corresponding to the single input selection, and displaying the determined aircraft checklist in response to the single input selection on the touch screen display.

BRIEF DESCRIPTION OF THE DRAWINGS

The present disclosure is best understood from the following detailed description when read with the accompanying Figures. It is emphasized that, in accordance with the standard practice in the industry, various features are not drawn to scale in the following Figures. In fact, the dimensions of the various features may be arbitrarily increased or reduced for clarity of discussion.

DETAILED DESCRIPTION

Figure 1:
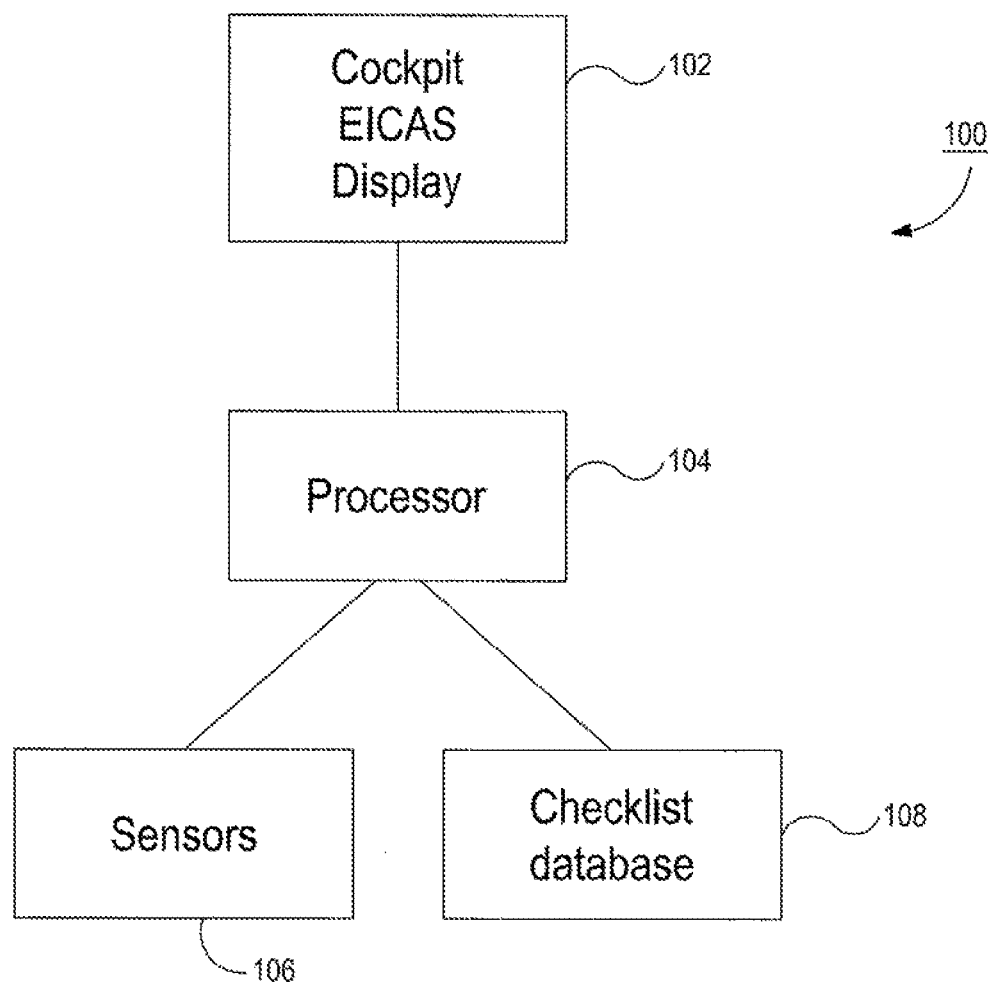
FIG. 1 illustrates a high level block diagram of an exemplary EICAS system of the present disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination, i.e., any element from one exemplary embodiment may be used in any other exemplary embodiment, without departing from the scope of the disclosure.

Additionally, certain terms are used throughout the following description and claims to refer to particular components of the disclosure. As one skilled in the art will appreciate, various entities may refer to the same component by different names, and as such, the naming convention for the elements described herein is not intended to limit the scope of the invention, unless otherwise specifically defined. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a high level block diagram of an exemplary EICAS system 100 of the present disclosure. The EICAS system 100 generally includes a plurality of sensors or other data collecting devices 106 positioned to monitor parameters in specific systems of an aircraft. For example, sensors 106 may be configured to monitor parameters in the aircraft engines such as pressures, temperatures, rotation speeds, fluid flow rates, and component vibrations. Additionally, sensors 106 may be configured to monitor other aircraft parameters, such as gear status, control surface positions, and electrical system status (among many other parameters). The sensors 106 are generally in communication with one or more processors 104 and are configured to communicate sensed parameter information to the processor 104. The processor 104 may generally include any microprocessor-type device configured to execute predetermined software algorithms/instructions. In the present exemplary embodiment, the processor 104 may include an onboard aircraft computer or other computer system (processor, memory, bus, I/O, etc.) configured to execute a program configured to operate the EICAS system 100, as further described herein. The processor 104 is in communication with a memory element or database 108 that contains checklist data for display on the EICAS system 100. Additionally, the processor 104 is in communication with the cockpit EICAS display screen 102, which is generally positioned in the cockpit in plain view of the crew. The EICAS display screen 102 may also have embedded processor(s) to handle workloads associated with the display and inputs received therefrom.

Figure 2:
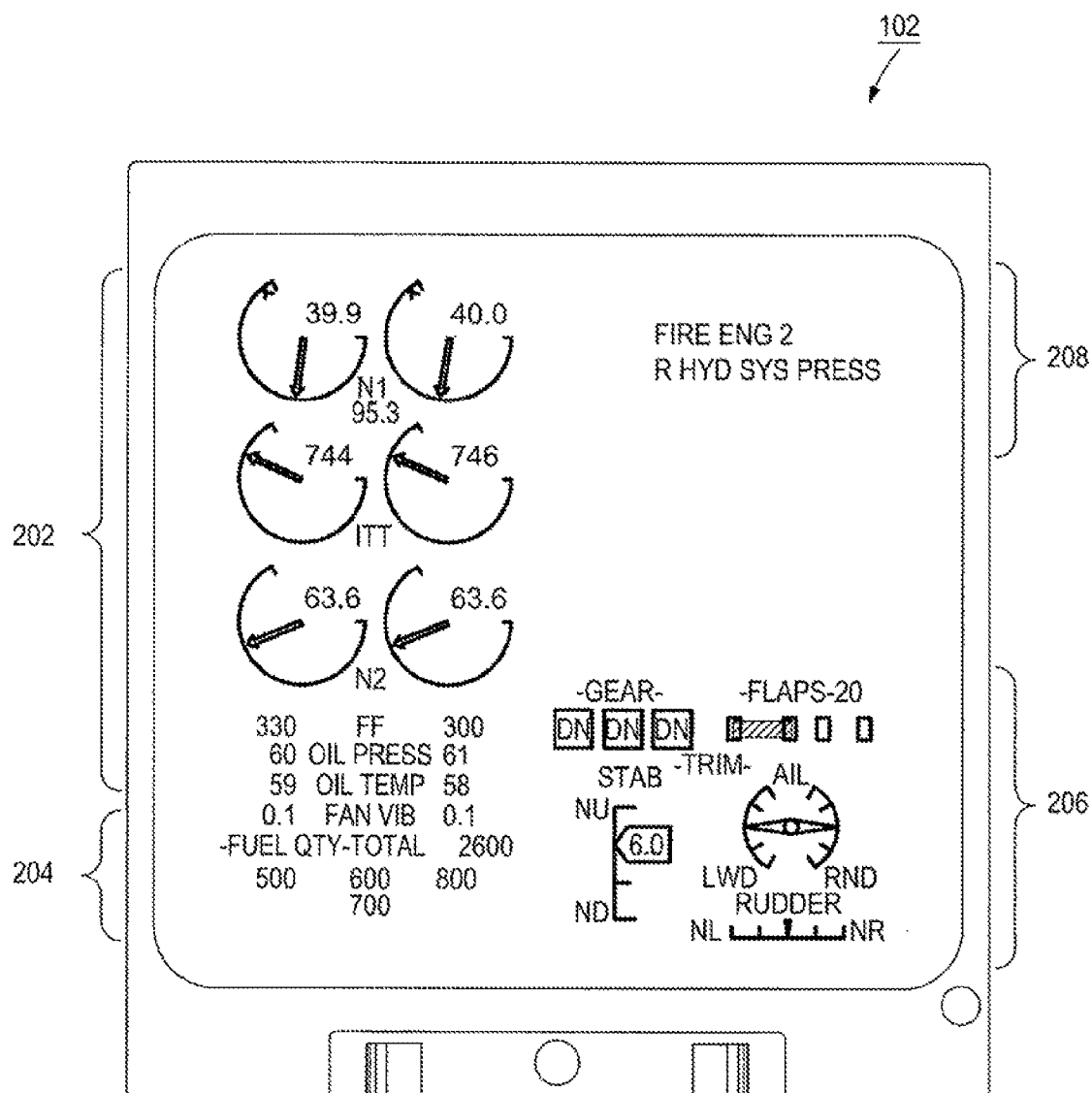
FIG. 2 illustrates an exemplary display of an EICAS system of the disclosure containing a CAS warning message.

FIG. 2 illustrates an exemplary display 102 of an EICAS system 100 of the present disclosure. The EICAS display 102 may generally comprise a touch screen-type display, which is generally known as an electronic visual display that is also capable of detecting the presence and location of a touch (human or passive objects) on the display area of the screen. As such, the touch screen 102 enables the crew to interact directly with the EICAS information through a single click or screen touch on a selected item (CAS message), rather than indirectly via the intermediate cursor control device used in conventional systems. Various types of touch screen displays may be used in the present disclosure, including resistive, capacitive, optical, dispersive, acoustic, or coded LCD, for example.

The EICAS display 102 includes a plurality of critical aircraft performance and operational status parameters displayed thereon. For example, the upper left hand side of the EICAS display 102 includes a plurality of aircraft engine parameter displays 202, which include pressures, temperatures, and vibrations related to the aircraft engines. In the lower left-hand corner of the EICAS display 102 fuel quantity and flow rate parameters 204 may be displayed. In the lower right-hand corner of the EICAS display 102 aircraft landing gear and control surface status information 206 may be displayed. Finally, in the upper right-hand corner of the EICAS display 102 there are two crew alert system (CAS) warning messages 208 displayed.

The exemplary CAS messages 208 [FIRE ENG 2 {fire detected in engine #2} and R HYD SYS PRESS (right hydraulic system failure)] are presented to represent critical messages, i.e., level three-type failures or warnings that represent situations that require immediate crew action. These types of CAS messages 208 typically require the crew to execute a particular sequence of procedures to address the situation represented by the message, and the specific procedures are essentially always presented in the form of a predefined checklist in the aviation industry. However, the inventors note that the exemplary CAS messages 208 may be any level or priority of message that may have an associated checklist.

The present disclosure presents the CAS messages 208 as selectable fields on the touch screen display 102. Thus, the crew is able to select a CAS message 208 by simply touching the CAS message 208 on the display 102. When a particular CAS message 208 is touched on the screen, the EICAS system 100 is automatically configured to display a predefined checklist associated with the selected CAS message 208. However, to prevent confusion as to which CAS messages are associated with displayable checklists, the CAS messages 208 may generally contain a visual identifier or other graphically distinguishing feature that indicates the CAS message 208 as being associated with additional checklist data through a single touch input on the touch screen, i.e., the distinguishing feature indicates to the crew that the CAS message 208 may be selected to display additional information.

Figure 3:
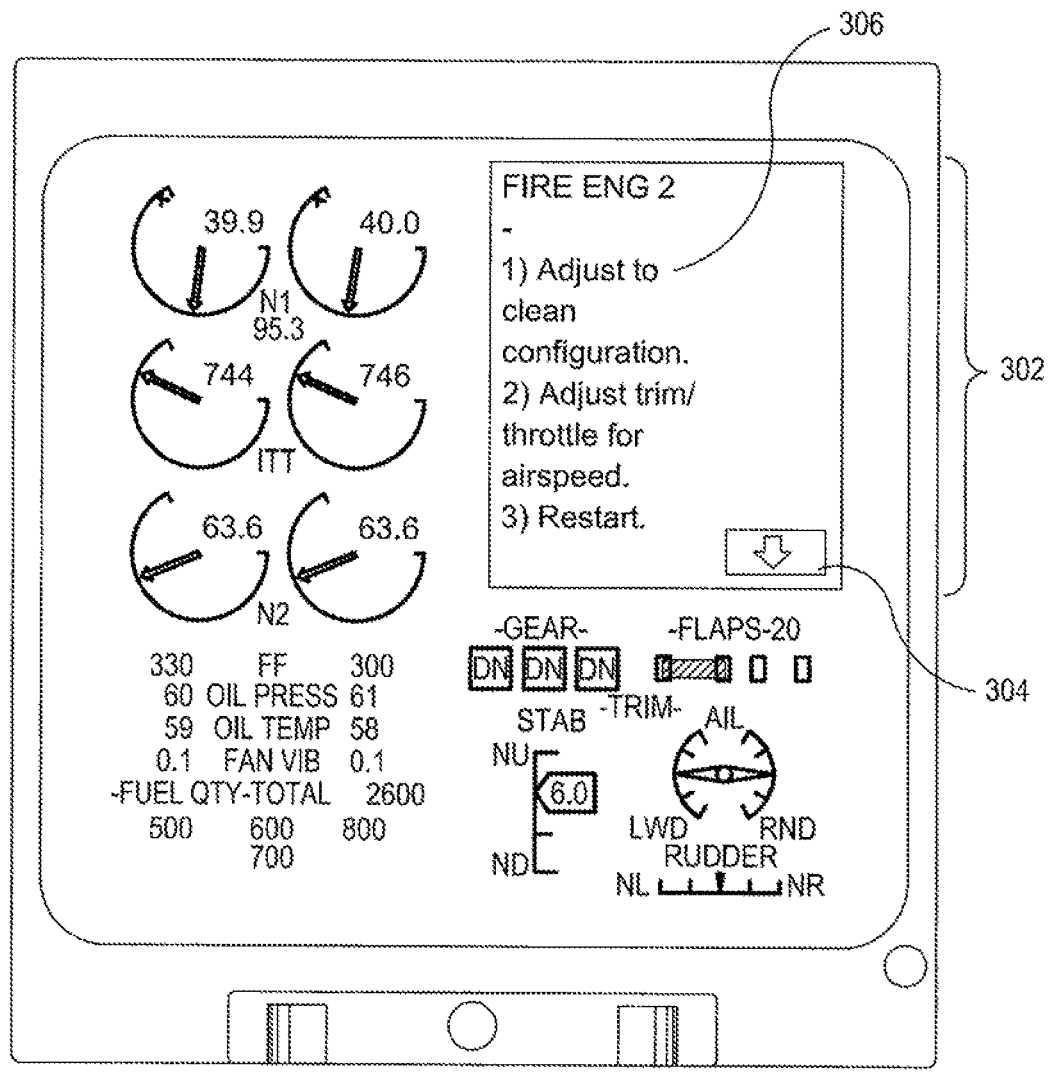
FIG. 3 illustrates an exemplary display of an EICAS system with a checklist activated.

FIG. 3 illustrates an exemplary display of an EICAS system 100 with an exemplary checklist 302 displayed in a pop-up type window. The checklist 302 represents the predefined sequence of procedures the crew will execute to address the CAS message 208 {FIRE ENG 2} shown in FIG. 2. The checklist may be displayed on the touch screen 102 after the crew merely touched the CAS message 208 on the touch screen 102. As such, the present disclosure allows the crew to avoid having to toggle through multiple screens of information to locate and display the checklist corresponding to the CAS message 208. Rather, the crew merely executes a single touch or a selection of the CAS message 208 of interest to automatically display the corresponding checklist 302 of remedial procedures to be followed to address the specific CAS message 208 condition. Since the checklist 302 may be longer than the display window containing the checklist, the display window may also include one or more scroll elements 304 that allow the user to scroll up/down through the checklist 302.

In another exemplary embodiment of the disclosure, the displayed checklist 302 may also include selectable fields therein. For example, the individual checklist steps 306 may also be selected on the touch screen 102, which causes the system 100 to display a more detailed description of the selected individual step (not shown). For example, in the checklist 302 illustrated in FIG. 3, step 1 of the checklist is to "adjust to clean." For more detail on this particular step, the crew may simply touch the step on the screen, and a more detailed list of steps for changing the aircraft to a "clean" configuration may be displayed, i.e., additional steps like flaps to 0°, gear up, etc.

In another exemplary embodiment of the disclosure, the checklist 302 may be displayed on the same screen as the EICAS information, but not in the pop-up type window described above. In this embodiment, the checklist 302 may be displayed in a predetermined area on the EICAS screen 102. Alternatively, the checklist to 302 may be displayed on another predetermined cockpit screen other than the EICAS, such as the PFD, MFD, heads up display, or other cockpit display screen. However, regardless of the screen the checklist is displayed on, the crew need only touch the CAS warning message 208 on the display 102 for the checklist to be retrieved and displayed.

In operation, with reference to FIGS. 1-3, the sensors 106 continually monitor various parameters of the aircraft and communicate the monitored parameters back to the processor 104. The processor 104 executes a predetermined algorithm or software program that allows the processor 104 to continually receive parameters from the sensors 106 and compare the received parameters to predetermined thresholds to determine if a CAS warning message 208 is to be generated. If the processor 104 determines that a CAS warning message 208 is appropriate, then the processor generates the appropriate CAS message 208 in accordance with the software and sends the CAS warning message 208 to the cockpit EICAS display 102.

The EICAS display 102, which is a touch screen, displays the CAS warning message 208 to the crew. The CAS warning message 208 may be categorized, i.e., level 1, 2, or 3, and maybe color-coded to match the category and prioritized in the order of presentation (if there is more than 1 CAS message at time), as is standard in the aviation industry. For those higher priority CAS warning messages 208 that require immediate crew reaction and the use of a checklist, i.e., level 3 messages, the displayed CAS warning message 208 is presented on the EICAS display 102 as a selectable field. The fact that a particular CAS message 208 is associated with a supporting checklist may be represented on the EICAS display 102 by brighter text, background box color, different font, etc. The crew selection of the CAS warning message 208 on the EICAS touch screen display 102 is communicated from the EICAS display 102 to the processor 104, which then retrieves a predetermined checklist 302 corresponding to the selected CAS warning message 208 from the checklist database 108, in accordance with a predefined software program or algorithm. The predefined checklist 302 is communicated from the processor 104 to the EICAS display 102 and displayed to the crew. As noted above, the checklist 302 may also contain selectable fields that are linked to more specific information contained in the checklist database 108 and are retrievable by the processor 104 in response to the crew selecting a particular field in the checklist 302.

The foregoing has outlined features of several embodiments so that those skilled in the art may better understand the present disclosure. Those skilled in the art will also appreciate that the present disclosure may be used as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure, as defined by the following claims.

I claim:

1. A crew alert system, comprising:
a processor in communication with a plurality of aircraft parameter sensors;
a checklist database in communication with the processor; and
a touch screen display in communication with the processor,
wherein the processor is configured to:
generate a crew alert warning message in response to a predefined sensor parameter;
receive a single touch screen input on the displayed crew alert warning message; and
retrieve and display, in response to the single touch screen input, a checklist corresponding to the crew alert warning message.

2. The crew alert system of claim 1, further comprising a primary flight display and or a multifunction display upon which the processor displays the checklist.

3. The crew alert system of claim 1, wherein the touch screen display comprises an engine instrumentation and crew alert system (EICAS) display.

4. The crew alert system of claim 3, wherein the EICAS display is configured to display integrated engine instrumentation and crew annunciations.

5. The crew alert system of claim 1, further comprising a heads up display upon which the processor displays the checklist.

6. The crew alert system of claim 1, wherein the crew alert system is positioned on an aircraft having the plurality of aircraft parameter sensors thereon.

7. An engine instrumentation and crew alert system (EICAS), comprising:
an onboard aircraft computer in communication with a plurality of aircraft sensors configured to monitor engine parameters, control surface parameters, hydraulic system parameters, and electrical system parameters, the onboard aircraft computer running a software program that supports the processor receiving inputs from the plurality of aircraft sensors and generating crew alert system (CAS) warning messages therefrom; and
an integrated touch screen EICAS display configured to simultaneously display aircraft engine parameters and CAS warning messages, the EICAS display also being configured to receive a single touch screen input from an aircraft crew member corresponding to the CAS warning message and to display a predetermined checklist corresponding to the selected CAS warning message.

8. The EICAS system of claim 7, further comprising a database of checklist information in communication with the onboard aircraft computer.

9. The EICAS system of claim 8, wherein the onboard aircraft computer is configured to receive the single touch screen input, determine a checklist corresponding to the single touch screen input, retrieve the determined corresponding checklist from the database of checklist information, and display the determined corresponding checklist.

10. The EICAS system of claim 8, wherein the determined corresponding checklist is displayed on the integrated touch screen EICAS display.

11. The EICAS system of claim 8, wherein the determined corresponding checklist is displayed on a PFD or MFD in communication with the onboard aircraft computer.

12. The EICAS system of claim 8, wherein the determined corresponding checklist is displayed on a heads up display in communication with the onboard aircraft computer.

13. The EICAS system of claim 8, wherein the EICAS system is positioned on an aircraft having the plurality of aircraft sensors thereon.

14. A method for single touch display of crew alert messages and corresponding checklists, comprising:
   sensing aircraft system parameters;
   generating a crew alert message from the sensed aircraft system parameters;
   displaying the generated crew alert message integrated with aircraft engine indicator information on a touch screen display;
   receiving a single input selection on the touch screen display directly over the generated crew alert message;
   determining an aircraft checklist corresponding to the single input selection; and
   displaying the determined aircraft checklist in response to the single input selection.

15. The method of claim 14, wherein determining an aircraft checklist corresponding to the single input selection comprises an aircraft computer executing a predetermined software package configured to access a checklist database to retrieve a predetermined checklist corresponding to the single input selection of the crew alert message on the touch screen display.

16. The method of claim 15, wherein displaying the determined aircraft checklist comprises displaying the aircraft checklist on an EICAS in conjunction with engine parameter information.

17. The method of claim 15, wherein displaying the determined aircraft checklist comprises displaying the aircraft checklist on a PFD or MFD.

18. The method of claim 15, wherein displaying the determined aircraft checklist comprises displaying the aircraft checklist on a heads up display.

19. The method of claim 14, further comprising receiving an input on the touch screen display that is displaying the determined aircraft checklist, the input corresponding to an item in the checklist, and in response to the input, displaying a narrow set of checklist information corresponding to the input.

20. The method of claim 14, wherein displaying the generated crew alert message further comprises graphically distinguishing the displayed crew alert message as being associated with additional checklist data through a single touch input on the touch screen.

* * * * *